United States Patent [19]
Gates

[11] Patent Number: 5,487,429
[45] Date of Patent: Jan. 30, 1996

[54] SPRING TOOTH HARROW PACKER

[76] Inventor: Michael B. Gates, R.R. 1, Box 60, Lansford, N. Dak. 58750

[21] Appl. No.: 303,778

[22] Filed: Sep. 9, 1994

Related U.S. Application Data

[63] Continuation-in-part of Ser. No. 16,791, Feb. 11, 1993, Pat. No. 5,358,056, which is a continuation-in-part of Ser. No. 725,342, Jul. 3, 1991, abandoned.

[51] Int. Cl.⁶ .............................. A01B 49/02; A01B 5/04
[52] U.S. Cl. .......................... 172/175; 172/173; 172/401; 172/519; 172/537
[58] Field of Search .................................... 172/170, 173, 172/174, 175, 400, 401, 395, 519, 537, 195, 197–200, 624.5, 634; 404/132, 128

[56] References Cited

U.S. PATENT DOCUMENTS

| | | | |
|---|---|---|---|
| 395,366 | 1/1889 | Van Pool | 172/173 |
| 644,604 | 3/1900 | Imboden | 172/173 |
| 974,427 | 11/1910 | Powers . | |
| 1,764,944 | 6/1930 | Fisher | 172/173 |
| 3,169,027 | 2/1965 | Oerman | 280/411 |
| 3,337,241 | 8/1967 | Neuhring | 280/411 |
| 3,539,016 | 11/1970 | Bauer et al. | 172/311 |
| 4,127,341 | 11/1978 | Stevens | 403/113 |
| 4,213,506 | 7/1980 | Hake | 172/624 |
| 4,342,366 | 8/1982 | Schenk et al. | 172/643 |
| 4,368,783 | 1/1983 | Hake et al. | 172/705 |
| 4,750,440 | 6/1988 | Pollard et al. | 172/624.5 |
| 4,821,809 | 4/1989 | Summach et al. | 172/179 |
| 4,877,090 | 10/1989 | Gullickson | 172/102 |
| 4,923,017 | 5/1990 | Meek et al. | 172/776 |
| 4,976,052 | 12/1990 | Jeane | 404/122 |
| 5,395,182 | 3/1995 | Rossburger | 404/128 |

OTHER PUBLICATIONS

Triple K. Cultivator Brochure Jan. 1980.
"Sunflower Series 5000 Field Cultivator", Sales Brochure, Sunflower Mfg. Co., Inc. Jan. 1989.
"Glencoe W300 Series Field Cultivators," Sales Brochure, Oct. 1983.
"Minimum Tillage Mulcher," Sales Brochures, Emmert Mfg. Co., Inc. Jan. 1982.

Primary Examiner—Terry Lee Melius
Assistant Examiner—Spencer Warnick
Attorney, Agent, or Firm—Zarley, McKee, Thomte Voorhees & Sease; Dennis L. Thomte

[57] ABSTRACT

A spring tooth harrow packer comprising a transversely extending draw bar which is wheel supported and which has a hitch extending forwardly therefrom for attachment to a tractor. A plurality of harrow sections are secured to the draw bar and are positioned rearwardly thereof which each of the harrow sections including a plurality of ground engaging spring teeth. A packer is mounted on the rearward end of each of the harrow sections and is pivotally secured thereto for selectively controlling the penetration depth of the teeth of the associated harrow section.

6 Claims, 10 Drawing Sheets

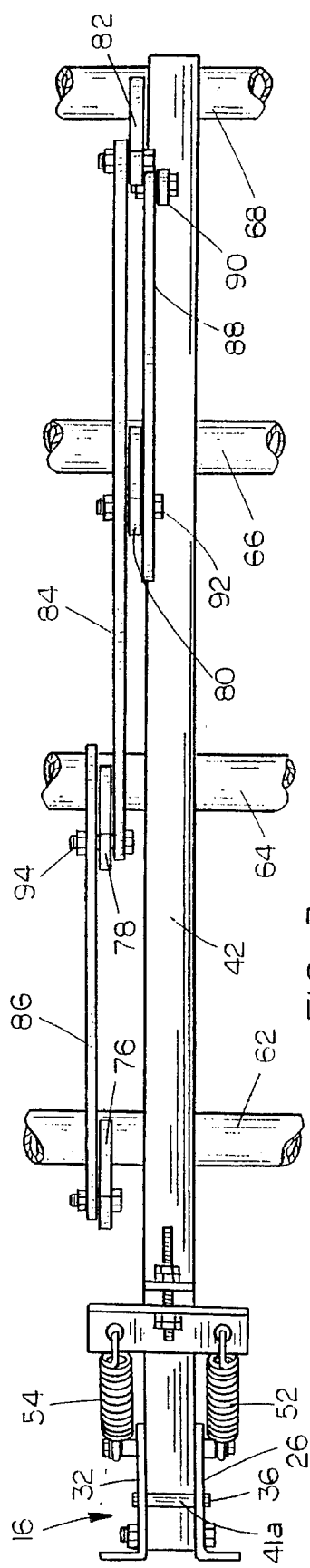
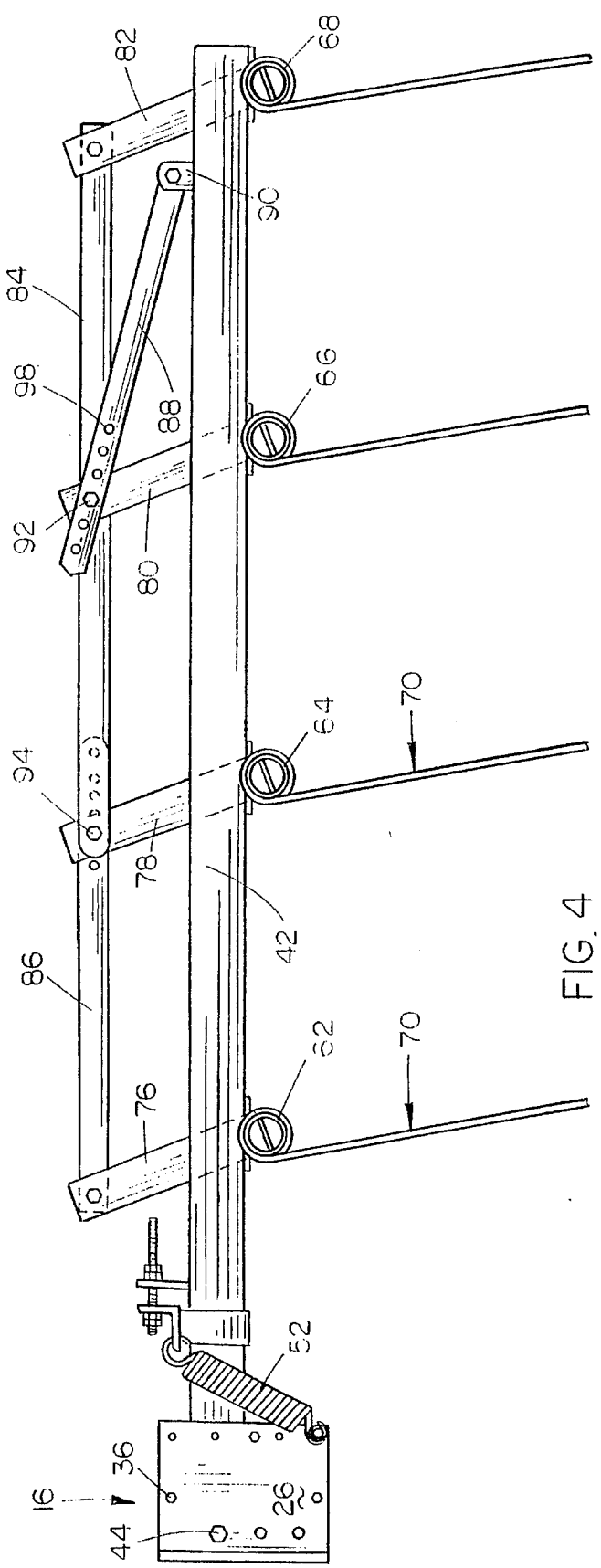
FIG. 3
FIG. 4

SPRING TOOTH HARROW PACKER

BACKGROUND OF THE INVENTION

This is a continuation-in-part application of Ser. No. 08/016,791, filed Feb. 11, 1993, now U.S. Pat. No. 5,358,056, which was a continuation-in-part application of application Ser. No. 07/725,342, filed Jul. 3, 1991, now abandoned.

This invention relates to a spring tooth harrow and more particularly to a spring tooth harrow including novel means for mounting the harrow on a pivotal draw bar and novel means for pressurizing the harrow sections and for maintaining the harrow sections in a substantially vertically disposed position during transport. Further, this invention relates to an adjustable packer which is mounted at the rearward end of the harrow to permit the operator to control the tine depth when harrow packing.

Conventional spring tooth harrows normally consist of an elongated, pivotal draw bar having a plurality of harrow sections mounted thereon so as to trail the draw bar. Normally, the harrow sections are connected to the draw bar by means of flexible chains or the like. One disadvantage of the prior art harrows is that the harrow sections tend to bounce when being pulled through the field. A further disadvantage of the conventional harrows is that the spring teeth thereof are not able to adequately penetrate the soil. Still another disadvantage of the prior art harrows is that there is normally not a convenient means for changing the attack angle of the spring teeth.

A further disadvantage of the prior art harrows is that when the draw bar is pivoted and folded to its transport position, the chain supported sections "bounce around" when the harrow is transported from one location to another.

A further disadvantage of the prior art harrows is that it is not believed that they provided an adjustable packer mounted at the rearward end of the harrow. In applicant's earlier invention, the tool bar controlled the depth of the forward portion of the harrow teeth but it was impossible to control the penetration depth of the rearwardmost harrow teeth or tines.

Therefore, it is the principal object of the invention to provide an improved spring tooth harrow.

A further object of the invention is to provide a spring tooth harrow including novel means which permits the harrow to be selectively vertically adjustably mounted on the draw bar so that the harrow section may be lowered relative to the draw bar as the spring teeth wear.

Still another object of the invention is to provide a spring tooth harrow including novel means for pressurizing the harrow section so as to avoid section bounce and so as to ensure maximum tooth penetration.

Still another object of the invention is to provide a spring tooth harrow including novel means for pressurizing the harrow section with the pressurizing means also serving to maintain each harrow section in a substantially vertically disposed position when the draw bar is pivoted and folded to its transport position.

Yet another object of the invention is to provide a spring tooth harrow including means for maintaining each harrow section in a substantially vertically disposed position when the draw bar is pivoted to its transport position.

Still another object of the invention is to provide a spring tooth harrow including means for adjusting the front row of spring teeth relative to the remaining rows of spring teeth for each section.

Still another object of the invention is to provide a spring tooth harrow including a packer assembly at the rearward end thereof.

Still another object of the invention is to provide a spring tooth harrow packer to permit the operator to control the fine depth when harrow packing.

Still another object of the invention is to provide a spring tooth harrow wherein the packer may be raised upwardly into an inoperative position to enable the spring tooth harrow to harrow only and further enables the packer to be adjusted downwardly with the teeth being angled back so that the spring tooth harrow will only pack.

These and other objects of the present invention will be apparent to those skilled in the art.

BRIEF DESCRIPTION OF THE DRAWINGS

FIG. 3 is a partial top view of one end of one harrow section;

FIG. 4 is a side view of one of the harrow sections;

SUMMARY OF THE INVENTION

Figure 1:
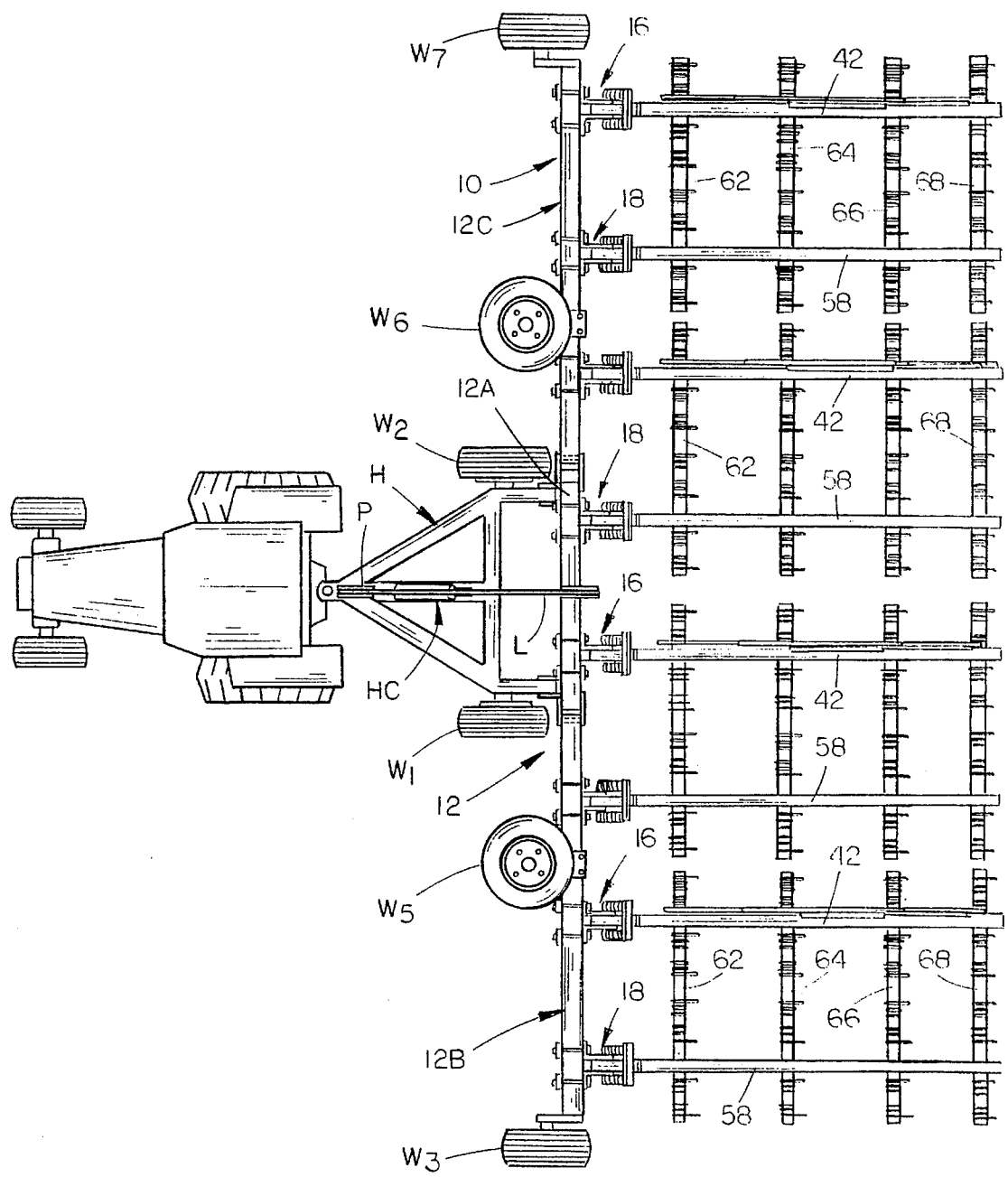
FIG. 1 is a plan view of the spring tooth harrow of this invention.
Figure 2:
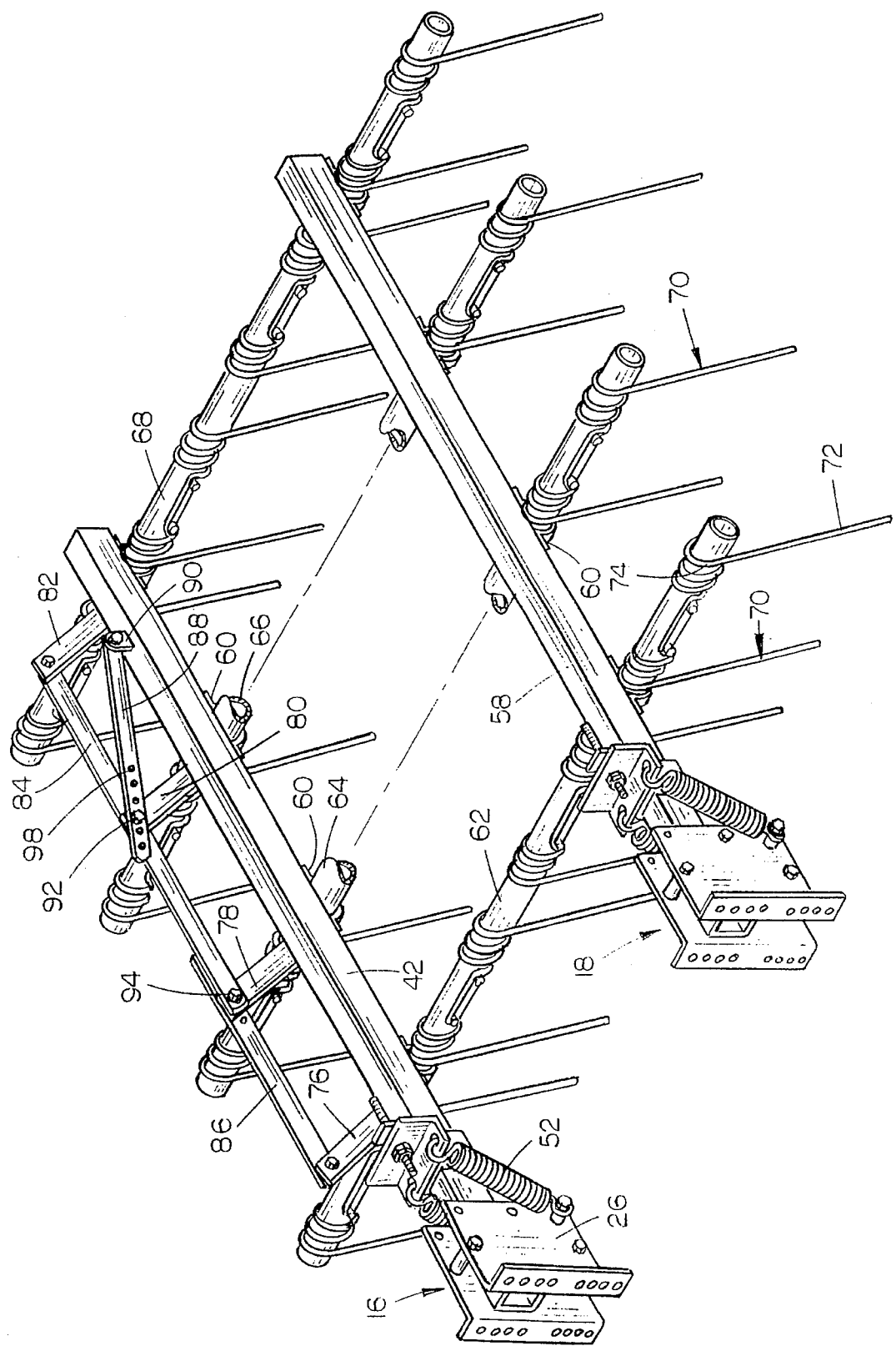
FIG. 2 is a perspective view of one end of one harrow section.

An improved spring tooth harrow is described comprising an elongated, pivotal draw bar having a plurality of the harrow sections of this invention mounted thereon. Each of the harrow sections includes a pair of mounting brackets at the forward end thereof which are selectively vertically adjustably mounted on the draw bar so that the mounting bracket may be lowered relative to the draw bar as the harrow teeth become worn. A pair of support arms are typically connected to the mounting brackets and include a spring means so that the harrow section will be pressurized to prevent harrow section bounce and to ensure that the spring teeth will adequately penetrate the soil. A plurality of transversely extending tooth supports are rotatably or pivotally mounted on the support arms and may be pivoted with respect thereto to change the angle of attack of the spring teeth. The forwardmost row of spring teeth may be pivoted relative to the remaining rows of spring teeth. The spring means also serves to maintain the harrow sections in a well supported, substantially vertically disposed position when the draw bar is pivoted or rotated to its transport position.

A packer is mounted at the rear end of each of the harrow sections. The packer comprises a transversely extending support bar or beam which is selectively pivotally mounted with respect to the rearward ends of the harrow section. The packer includes wheels which may be comprised of steel, rubber or coil. Utilizing the packer, penetration depth of the teeth may be precisely controlled. Further, the packer wheels may be pinned upwardly into an inoperative position so that the spring tooth harrow only harrows and does not pack. Conversely, the harrow may be used to only pack if so desired.

DESCRIPTION OF THE PREFERRED EMBODIMENT

The spring tooth harrow of this invention is referred to generally by the reference numeral 10 and is designed to be pulled behind a tractor or the like to harrow the soil. Most spring tooth harrows include an elongated transversely extending draw bar 12 to which the various harrow sections 14 are connected. Draw bar 12 is of conventional design and includes a center section 12A supported by wheels $W_1$ and $W_2$. Wing section 12B and 12C are pivotally connected to the outer ends of center section 12A in conventional fashion. Wheels $W_3$ and $W_4$ support the ends of the wing sections 12B and 12C respectively when the draw bar 12 is in its field position of FIG. 1. The axis of each of the pivotal connections between the center section 12A and the wing sections 12B and 12C wheels dwells in a horizontal plane transverse to the longitudinal axis of draw bar 12 when the draw bar 12 is in the field position of FIG. 1.

Figure 7:
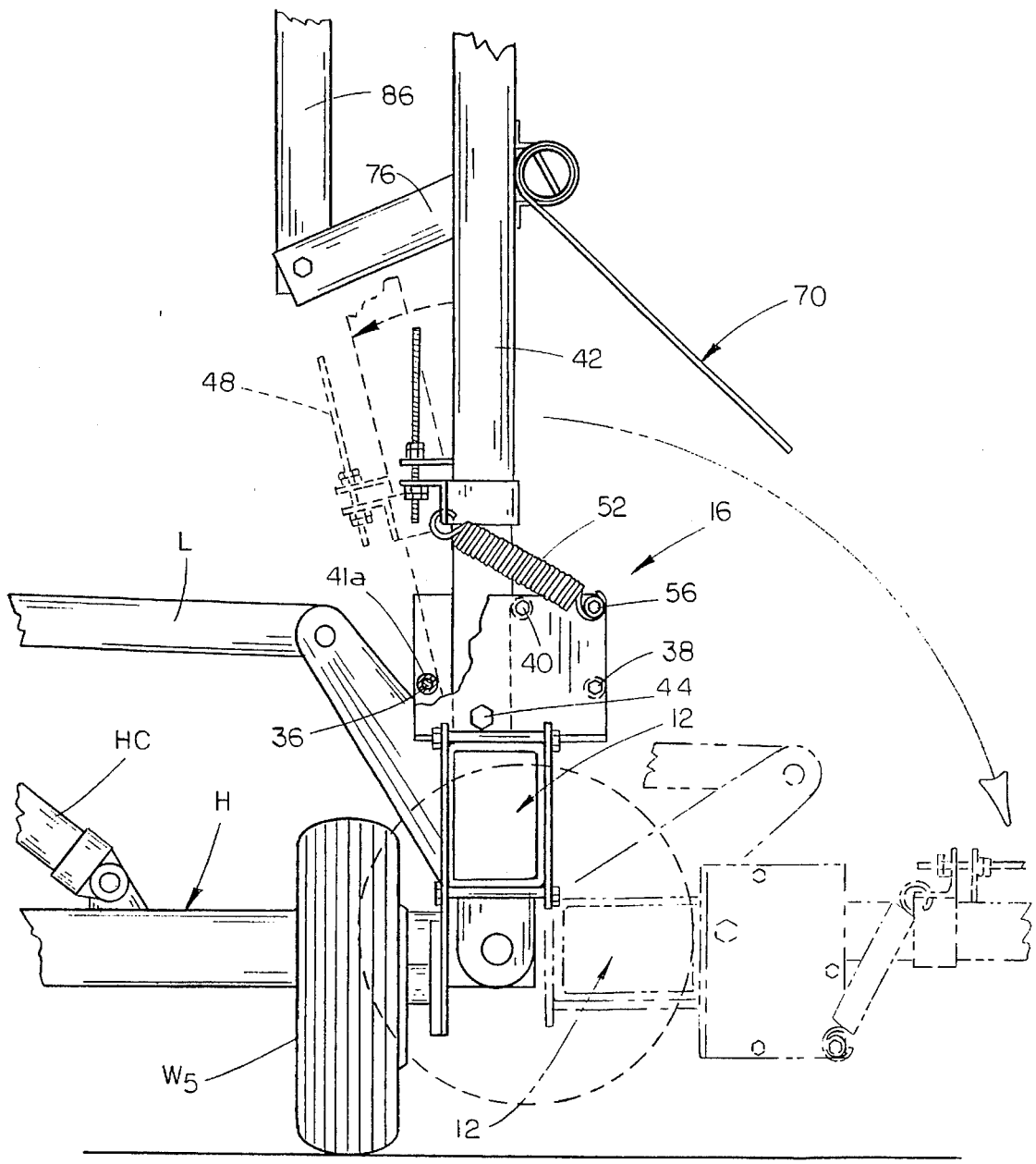
FIG. 7 is a partial side view illustrating the harrow sections in a substantially vertically disposed position after the draw bar has been pivoted or rotated to its transport position.
Figure 8:
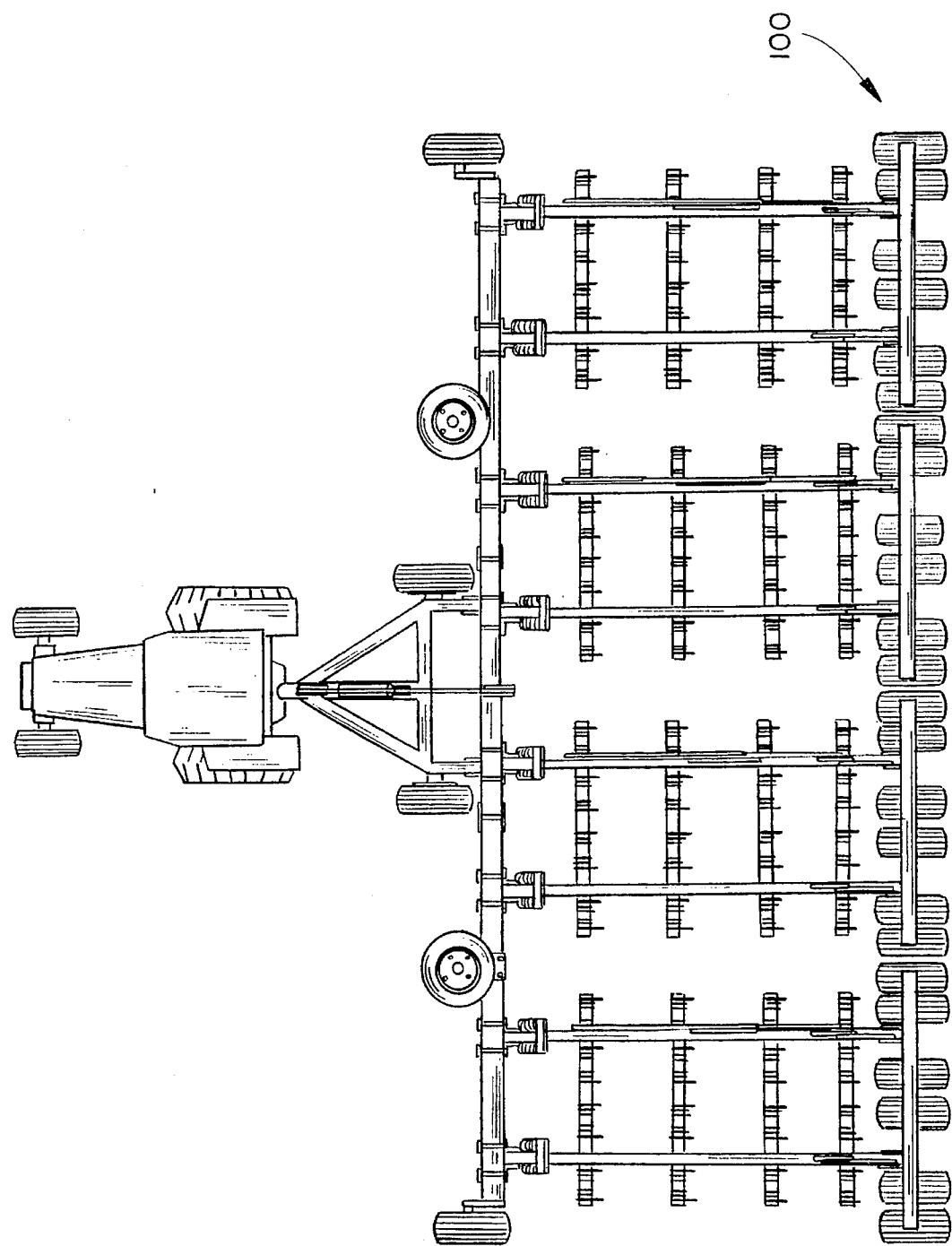
FIG. 8 is a plan view of the spring tooth harrow packer of this invention.
Figure 9:
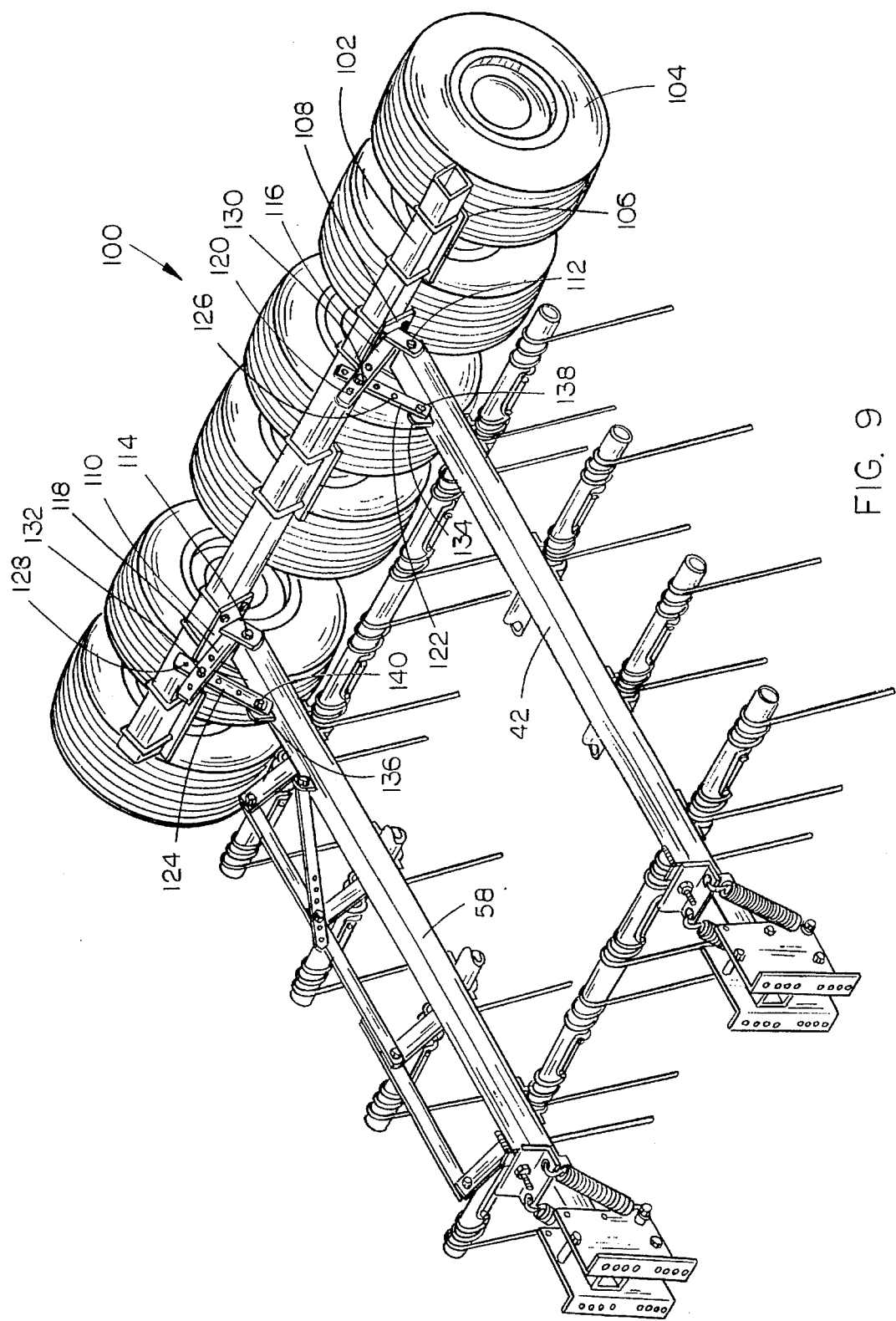
FIG. 9 is a perspective view of one of the spring tooth harrow packer sections.
Figure 10:
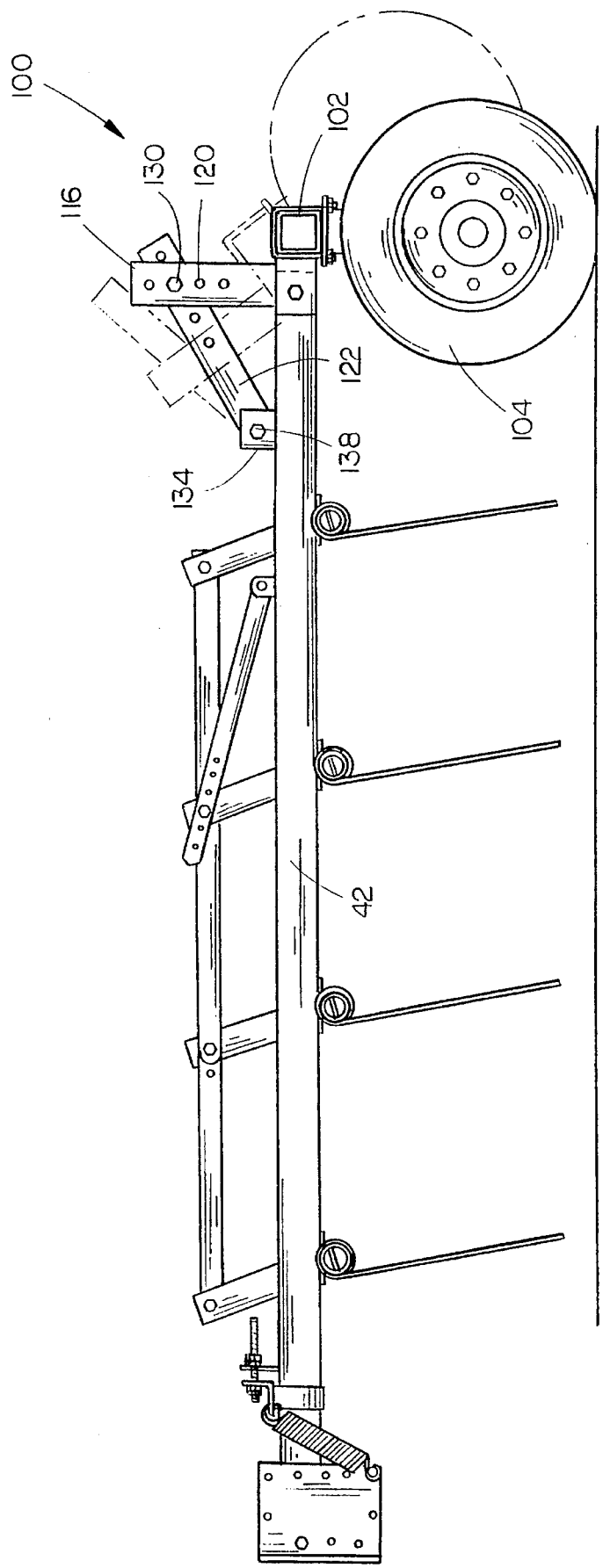
FIG. 10 is a side view of one of the spring tooth harrow packer sections.

Draw bar 12 is rotatable or pivotal with respect to hitch H by conventional means to enable draw bar 12 to be selectively moved between the field position of FIG. 1 to the transport position of FIG. 7 so that the harrow sections may be raised from the ground. As seen in the drawings, a hydraulic cylinder HC is mounted on hitch H and has its cylinder rod connected to post P. Post P is connected to center section 12A of draw bar 12 by means of a linkage L. Thus, extension of the cylinder rod of the hydraulic cylinder HC causes draw bar 12 to be rotated from the field position to the transport position. Conversely, retraction of the cylinder rod of hydraulic cylinder HC causes the draw bar 12 to be moved from its transport position of FIG. 7 to the field position of FIG. 1. When the draw bar 12 is moved to its transport position, wheels $W_5$ and $W_6$ are lowered into ground engagement in conventional fashion to enable the wing sections 12B and 12C to be folded rearwardly with respect to center section 12A to reduce the width of the harrow for transport in conventional fashion. The spring tooth harrow of this invention may be conveniently attached to almost every type of draw bar and can be supplied as a replacement for worn harrow sections. Thus, such an invention will not always be sold with a draw bar since the harrow section of this invention can be conveniently attached to square or rectangular draw bars.

Each of the barrow sections 14 comprises a pair of spaced-apart mounting brackets 16 and 18 which are selectively vertically adjustably mounted to the draw bar by means of conventional bolts and clamps. Inasmuch as each of the mounting brackets 16 and 18 are identical, only mounting bracket 16 will be described in detail.

Mounting bracket 16 includes a pair of vertically disposed bracket members 20 and 22 which are L-shaped. Bracket member 20 includes a flat front portion having a flat rear portion extending rearwardly therefrom. The flat front portion is provided with a plurality of bolt openings 28 formed therein to permit the bracket member to be selectively vertically adjustably mounted on the draw bar. Similarly, bracket member 22 includes a flat front portion 30, flat rear portion 32 and bolt openings 34 in flat portion 30. Spacer bolts 36, 38 and 40 extend between the flat rear portions 26 and 32 and have collars 41a, 41b and 41c mounted thereon between the rear portions 26 and 32 to maintain the horizontal spacing therebetween. The forward end of arm 42 is pivotally connected to mounting bracket 16 as seen in the drawings by means of bolt 44. Bolts 36 and 40 also limit the pivotal movement of arm 42 with respect to bracket 16 as will be described in greater detail hereinafter.

Figure 5:
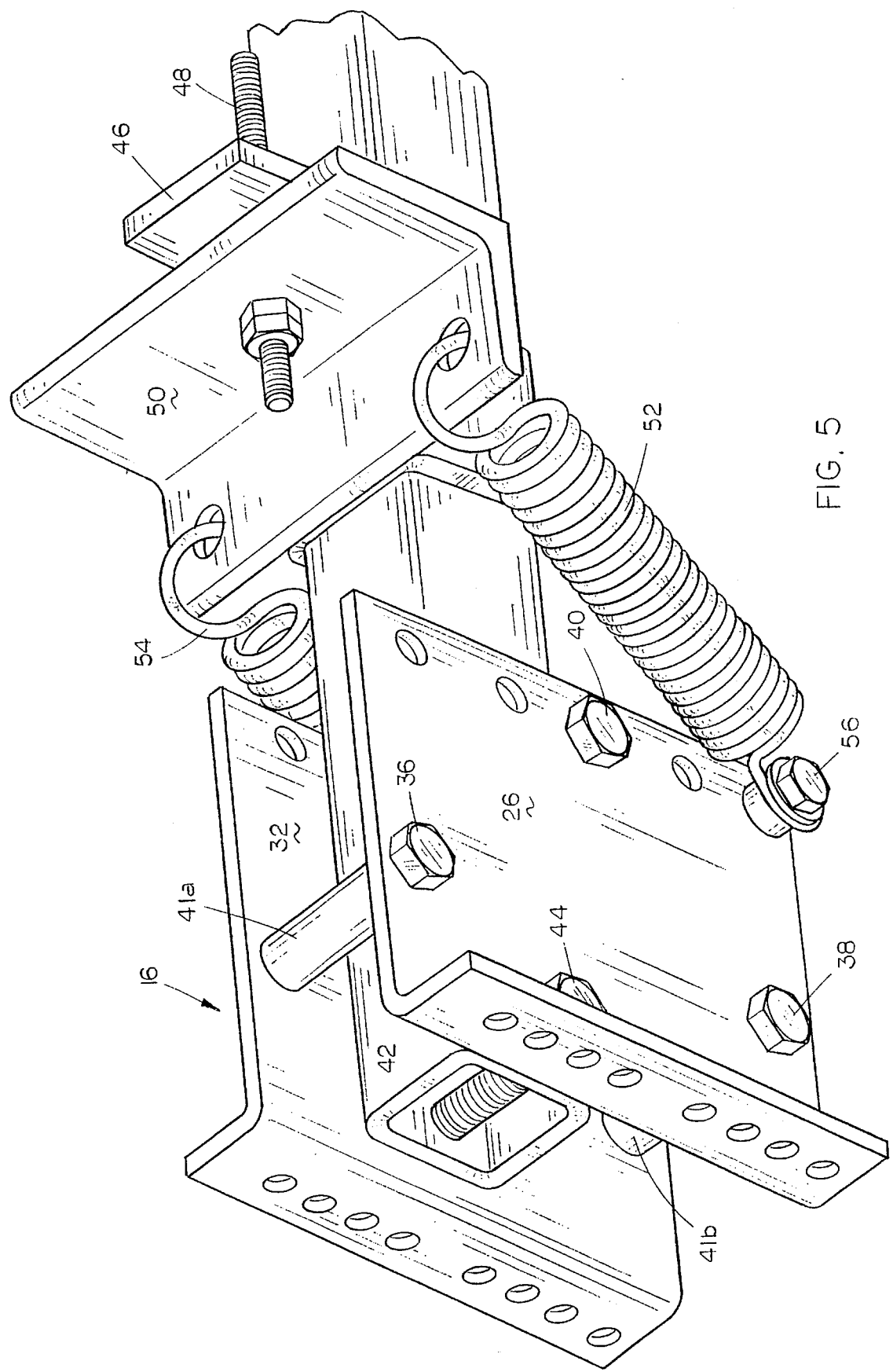
FIG. 5 is a perspective view of the means for mounting one end of the harrow section to the tool bar.
Figure 6:
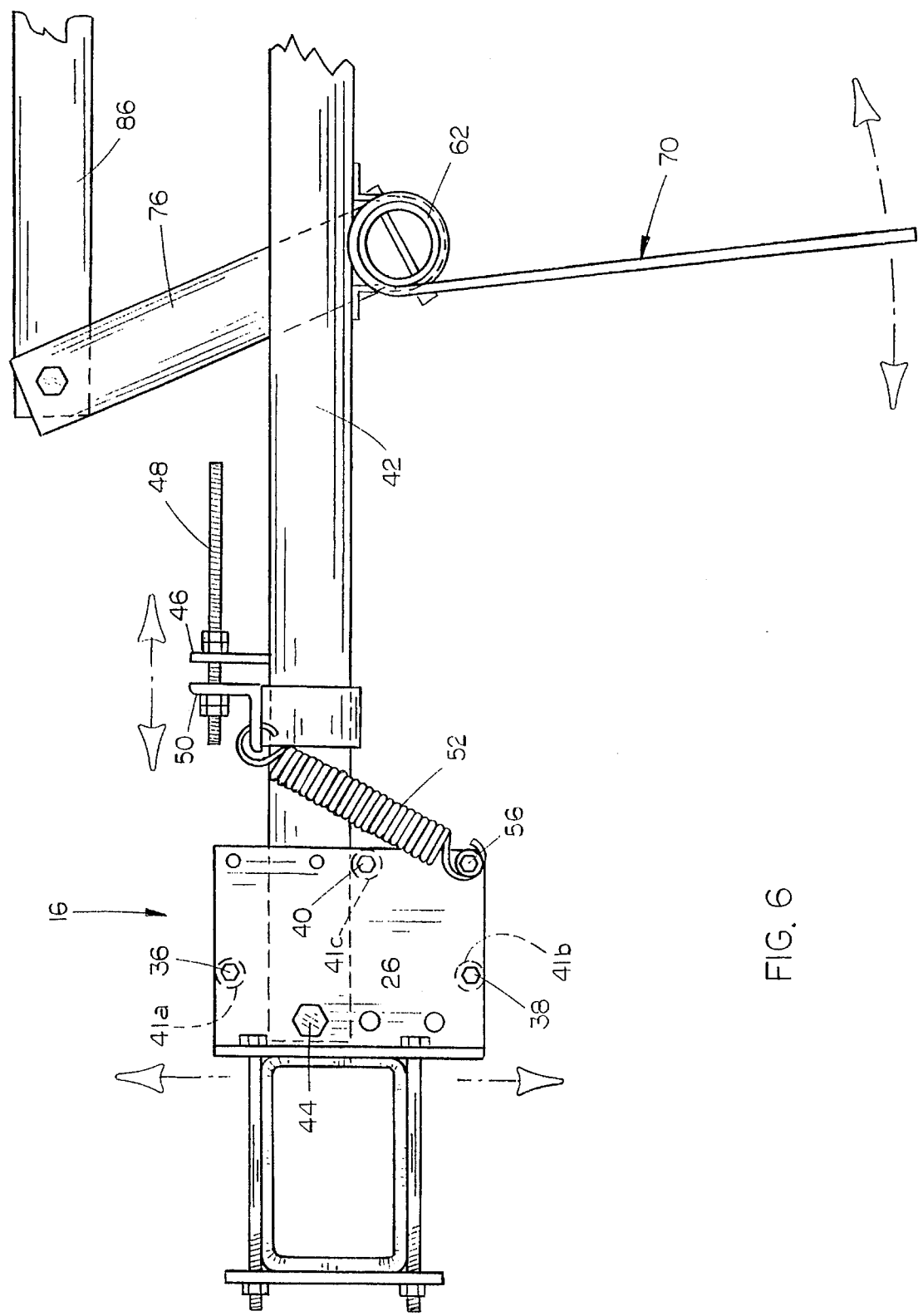
FIG. 6 is a side elevational view illustrating the means by which one harrow section is secured to the tool bar.

Ear 46 is welded to the upper surface of arm 42 and has an adjustment bolt 48 extending therethrough. Angle 50 is mounted on the forward end of adjustment bolt 48 and is disposed transversely to the longitudinal axis of arm 42 as seen in FIG. 5. Springs 52 and 54 are secured at their upper ends to angle 50 and are secured at their lower ends to the opposite ends of bolt 56 which is secured to and which extends between the lower rearward ends of flat rear portions 26 and 32. The adjustment of bolt 48 changes the tension in the springs 52 and 54 to vary the amount of downward yieldable pressure exerted on the forward end of arm 42. Arm 58 is identical to arm 42 and is pivotally connected to bracket 18. Arms 42 and 58 are provided with a plurality of U-shaped straps 60 welded to the underside thereof in which are rotatably received the support pipes 62, 64, 66, and 68. A plurality of spring teeth 70 are secured to each of the support pipes 62 and includes shank portion 72 which extends downwardly from coiled portion 74. Bars 76, 78, 80 and 82 are welded to pipes 62, 64, 66 and 68 respectively and extend upwardly therefrom. Link 84 pivotally connects the upper ends of bars 78, 80 and 82. Link 86 adjustably connects the upper ends of bars 76 and 78 as seen in the drawings. Thus, the bars 76, 78, 80 and 82 are moved in unison by the links 84 and 86 when the links 84 and 86 are connected. Movement of the bars 76, 78, 80 and 82 causes rotation of the support pipes 62, 64, 66 and 68 respectively so as to change the angle of attack of the shank portions of the spring teeth. Links 84 and 86 are maintained in position by means of arm 88 which it pivotally connected at its rearward end to ear 90 welded to the upper side of the rearward end of arm 42. The forward end of arm 88 is adjustably secured to the bolt 92 which connects the upper end of bar 80 with link 84. Thus, when bolt 92 is removed, the bars 76, 78, 80 and 82 may be pivoted in unison to the desired position and then held in that position by reinstalling bolt 92 through bar 80, link 84 and the forward end of arm 88.

The various harrow sections are secured to the draw bar 12 by the brackets 16 and 18. As the spring teeth become worn, the brackets 16 and 18 may be lowered with respect to the draw bar to effectively lower the lower ends of the shank portions of the spring teeth 70. During field operation, the springs 52 and 54 urge arm 42 downwardly with respect to the mounting bracket 16 so as to prevent harrow bounce and so as to force the spring teeth into the soil which is being harrowed. The springs associated with bracket 18 similarly urge arm 58 downwardly with respect to the mounting bracket 18.

If it is desired to have the angle of attack of all of the harrow teeth to be the same, bolt 94 is left in position and the bolt 92 is removed. Bars 84 and 86 are then moved in unison to cause the pipes 62, 64, 66 and 68 to rotate within their straps 60 in unison. When the teeth have been positioned as desired, the bolt 92 is then reinserted through one of the openings 98 in arm 88. It if is desired to change the angle of attack of the spring teeth on pipe 62 with respect to the remaining pipes, bolt 94 is removed to permit pipe 62 to be rotated independently of the remaining pipes thereby permitting angle of attack of the spring teeth on the pipe 62 to have a different angle than the remaining teeth. Many farmers prefer that the shank portions 72 on teeth 70 on the pipe 62 extend rearwardly at a greater angle than the spring teeth on the remaining pipes so as to be better able to penetrate through trash or stubble on the ground being harrowed.

As seen in FIG. 7, when draw bar 12 has been moved to its transport position, the harrow sections are positioned in a substantially vertically disposed position. The springs 52 yieldably maintain the harrow sections in the transport position of FIG. 7 to prevent the harrow sections from "bouncing around" as is the case with chain supported harrow sections. This is accomplished by the springs 52 urging the arms 42 and 58 rearwardly against the collars 42c on bolts 40. Further, the bolts 36 and 40 on each mounting bracket also limit the movement of the associated arms 42 to maintain the arms 42 in a substantially vertically disposed position.

FIGS. 8-11 illustrate the packer portion of the spring tooth harrow, the reference numeral 100 referring generally to the packer assembly. Packer assembly 100 includes a transversely extending beam or bar 102 having a plurality of packer wheels 104 secured thereto by U-bolt assemblies 106.

A pair of plates 108 and 110 are positioned at the forward side of bar 102 and are pivotally connected to the rearward end of the arms 42 and 58 by bolts 112 and 114 respectively. Link arms 116 and 118 are also secured to the forward side of bar 102 by welding or the like and extend upwardly therefrom as seen in the drawings. Each of the link arms 116 and 118 have a plurality of vertically spaced openings 120 formed therein. Adjustment arms 122 and 124, having a plurality of horizontally spaced openings 126 and 128 formed therein respectively, are secured to the link arms 116 and 118 by bolts 130 and 132 respectively. The forward ends of adjustment arms 122 and 124 are secured to the brackets 134 and 136, which are welded to arms 42 and 58 respectively, by bolts 138 and 140 respectively.

Figure 11:
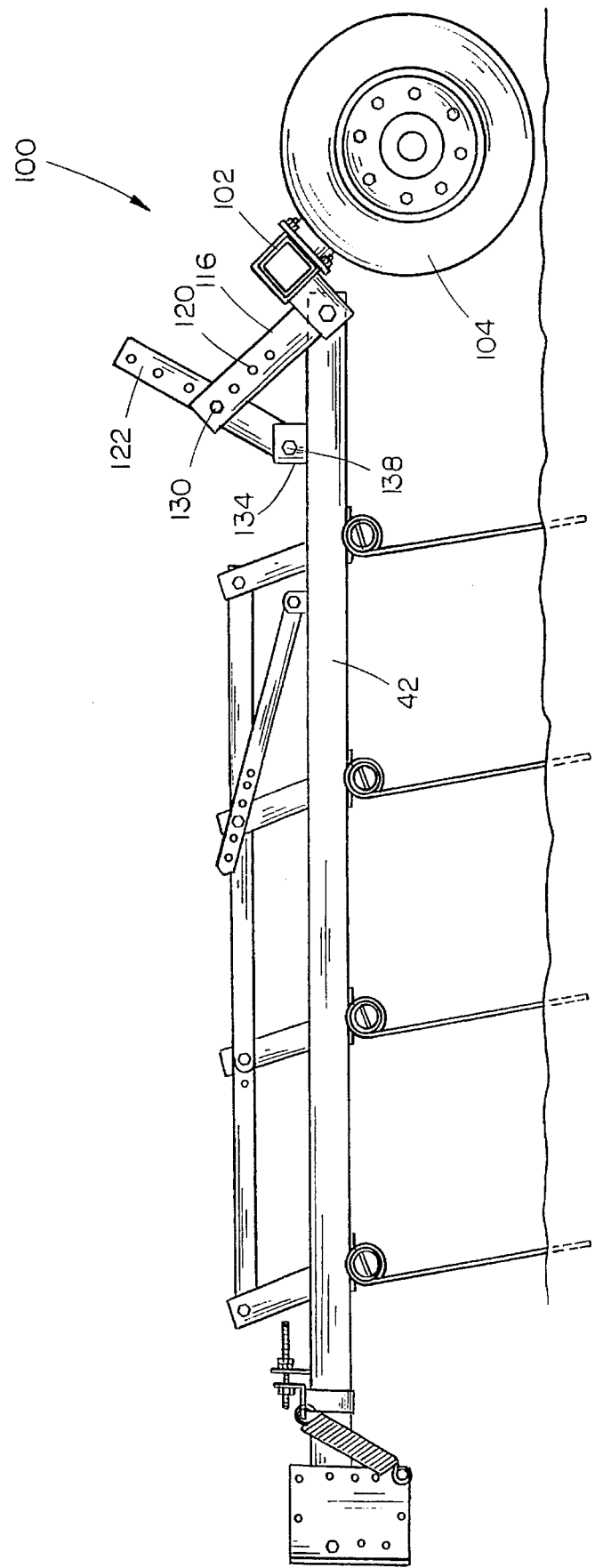
FIG. 11 is a view similar to FIG. 10 except that the packer wheels have been raised to a non-ground engaging position.

Thus, by changing the relationship of the connection between the link arms 116-118 and adjustment arms 122-124, the penetration depth of the rearward ends of the tines or teeth may be precisely controlled. The tool bar carries or supports the forward end of the harrow sections and limits the penetration depth of the harrow teeth at the forward end of the harrow section. Thus, the operator is able to control the tooth depth when harrow packing which allows for surface packing which is important when seeding small grains. Further, the packer assembly 100 may be pinned up as illustrated in FIG. 11 so that only harrowing is achieved. Conversely, the packer wheels may be adjusted down to harrow pack or the teeth may be adjusted or angled upwardly so that packing only occurs.

Thus it can be seen that the invention accomplishes at least all of its stated objectives.

I claim:

1. A spring tooth harrow packer, comprising:

an elongated, horizontally disposed and transversely extending draw bar having rearward and forward sides;

said draw bar being wheel supported and having a hitch extending forwardly therefrom for attachment to a tractor;

a plurality of harrow sections operatively secured to said draw bar and being positioned rearwardly thereof; said harrow sections including a plurality of ground engaging spring teeth;

each of said harrow sections being pivotally secured, about a horizontal axis, to said draw bar:

and a packer assembly mounted on the rearward end of each of said harrow sections;

said packer assembly including a plurality of rotatable packer elements;

said packer assembly including a transversely extending support bar which is secured to the rearward end of the associated harrow section;

and adjustment means for selectively vertically moving said packer assembly with respect to the associated harrow section for selectively controlling the penetration depth of at least the teeth at the rearward end of the associated harrow section and wherein said adjustment means permits said packer assembly to be raised out of ground engagement to enable the spring tooth harrow packer to only harrow.

2. The spring tooth harrow packer of claim 1 wherein each of said harrow sections includes at least one substantially horizontally disposed and rearwardly extending support arm positioned rearwardly of said draw bar and having rearward and forward ends; a plurality of transversely extending, and horizontally spaced-apart tooth supports rotatably mounted on said support arm; said spring teeth secured to said tooth supports and normally extending downwardly therefrom; and adjustable linkage means operatively connecting said tooth supports whereby said tooth supports may be rotated in unison.

3. The spring tooth harrow of claim 2 wherein said adjustable linkage means includes means for changing the rotational relationship of the forwardmost tooth support with respect to the tooth supports positioned rearwardly thereof.

4. A spring tooth harrow packer, comprising:

an elongated, horizontally disposed and transversely extending draw bar having rearward and forward sides;

said draw bar being wheel supported and having a hitch extending forwardly therefrom for attachment to a tractor;

a plurality of harrow sections operatively secured to said draw bar and being positioned rearwardly thereof; said harrow sections including a plurality of ground engaging spring teeth;

each of said harrow sections being pivotally secured, about a horizontal axis, to said draw bar;

and a packer assembly mounted on the rearward end of each of said harrow sections;

said packer assembly including a plurality of rotatable packer elements;

said packer assembly including a transversely extending support bar which is pivotally secured, about a horizontal axis, to the rearward end of the associated harrow section;

and adjustment means for selectively pivotally moving said packer assembly with respect to the associated harrow section for selectively controlling the penetration depth of the teeth of the associated harrow section and wherein said adjustment means permits said packer assembly to be raised out of ground engagement to enable the spring tooth harrow packer to only harrow.

5. The spring tooth harrow packer of claim 4 wherein each of said harrow sections includes at least one substantially horizontally disposed and rearwardly extending support arm positioned rearwardly of said draw bar and having rearward and forward ends; a plurality of transversely extending, and horizontally spaced-apart tooth supports rotatably mounted on said support arm; said spring teeth secured to said tooth supports and normally extending downwardly therefrom; and adjustable linkage means operatively connecting said tooth supports whereby said tooth supports may be rotated in unison.

6. The spring tooth harrow of claim 5 wherein said adjustable linkage means includes means for changing the rotational relationship of the forwardmost tooth support with respect to the tooth supports positioned rearwardly thereof.

* * * * *